(12) United States Patent
Aji et al.

(10) Patent No.: US 11,402,258 B2
(45) Date of Patent: Aug. 2, 2022

(54) DETECTING MACHINE ACTION USING A MACHINE ACTION DETECTION SYSTEM

(71) Applicant: Adrich, Inc., Pittsburgh, PA (US)

(72) Inventors: Adhithi Venkatesh Aji, Pittsburgh, PA (US); Ranjith Ravindra Shanbhag, Pittsburgh, PA (US)

(73) Assignee: Adrich, Inc., Pittsburgh, PA (US)

( * ) Notice: Subject to any disclaimer, the term of this patent is extended or adjusted under 35 U.S.C. 154(b) by 237 days.

(21) Appl. No.: 16/808,604

(22) Filed: Mar. 4, 2020

(65) Prior Publication Data

US 2020/0200590 A1 Jun. 25, 2020

Related U.S. Application Data

(63) Continuation-in-part of application No. 15/615,371, filed on Jun. 6, 2017, now Pat. No. 10,664,796, which
(Continued)

(51) Int. Cl.
*G01H 1/16* (2006.01)
*G06Q 10/08* (2012.01)
(Continued)

(52) U.S. Cl.
CPC ........... *G01H 1/16* (2013.01); *G05B 23/0283* (2013.01); *G06Q 10/087* (2013.01); *G07C 3/02* (2013.01)

(58) Field of Classification Search
CPC .. G05B 23/02; G05B 23/0283; G05B 19/042; G05B 2219/37351; G07C 3/08;
(Continued)

(56) References Cited

U.S. PATENT DOCUMENTS 7,612,654 B2 11/2009 Bender et al.
7,775,130 B2 8/2010 Harish
(Continued)

FOREIGN PATENT DOCUMENTS

DE 102010030362 A1 12/2011
WO 2015153768 A1 10/2015

OTHER PUBLICATIONS

Swedberg, Thinfilm Launches OpenSense Printed NFC Sensor Label for Bottles, RFID Journal, Feb. 17, 2015, pp. 1-3, Retrieved from the Internet: URL: https://www.rfidjournal.com/articles/pdf?12750.
(Continued)

*Primary Examiner* — Andrew Joseph Rudy
(74) *Attorney, Agent, or Firm* — Dentons Cohen & Grigsby P.C.

(57) ABSTRACT

A method and system to detect a plurality of device activities of a device using a device activity monitoring system has been described. The device monitoring activity system includes a vibration sensor in electronic communication with the device to detect vibration of the device. An interrupt counter in communication with the vibration sensor to measure a count of vibration detected by the vibration sensor within a pre-determined period. A storage unit in electronic communication with the interrupt counter to store the count of vibration. A controller in electronic communication with the vibration sensor and the storage unit to determine a mapping between the measured count and one of the plurality of device activities. A transmitter in electronic communication with the controller to autonomously transmit an output signal when the controller determines the mapped one of the plurality of device activities.

14 Claims, 7 Drawing Sheets

Related U.S. Application Data is a continuation-in-part of application No. 15/370,933, filed on Dec. 6, 2016, now Pat. No. 10,430,755.

(60) Provisional application No. 62/263,688, filed on Dec. 6, 2015.

(51) Int. Cl.
*G05B 23/02* (2006.01)
*G07C 3/02* (2006.01)

(58) Field of Classification Search
CPC ........ G07C 3/02; G06Q 10/08; G06Q 10/087; G01H 1/00; G01H 1/16
USPC .......................................................... 705/28
See application file for complete search history.

(56) References Cited

U.S. PATENT DOCUMENTS

| | | | |
|---|---|---|---|
| 8,161,813 B2 | 4/2012 | Faist | |
| 9,990,605 B2 | 6/2018 | Harcar et al. | |
| 10,072,964 B2* | 9/2018 | Gurumohan | G01F 23/2962 |
| 10,169,787 B2 | 1/2019 | Scrivner | |
| 10,262,293 B1 | 4/2019 | Prater | |
| 10,302,478 B1* | 5/2019 | Bennett | G01F 23/2928 |
| 10,324,075 B2* | 6/2019 | Gurumohan | G01F 22/00 |
| 10,339,495 B2 | 7/2019 | Swafford et al. | |
| 10,430,755 B2 | 10/2019 | Aji | |
| 10,443,785 B2 | 10/2019 | Song | |
| 10,459,103 B1 | 10/2019 | Shi | |
| 10,664,796 B2* | 5/2020 | Aji | G06Q 30/0251 |
| 10,670,444 B2* | 6/2020 | Gurumohan | G01N 33/14 |
| 11,087,271 B1* | 8/2021 | Guan | G06Q 10/087 |
| 11,099,166 B2* | 8/2021 | Gurumohan | G01N 33/02 |
| 11,100,741 B2* | 8/2021 | Rahilly | G16H 40/20 |
| 11,113,661 B2* | 9/2021 | Rahilly | G16H 40/20 |
| 11,127,069 B2* | 9/2021 | Aji | G06Q 30/0635 |
| 11,138,555 B2* | 10/2021 | Aji | G06Q 10/087 |
| 11,238,401 B1* | 2/2022 | Guan | G06F 3/04817 |
| 2006/0012464 A1 | 1/2006 | Harish et al. | |
| 2009/0114041 A1 | 5/2009 | Nitzan et al. | |
| 2010/0305530 A1 | 12/2010 | Larkin | |
| 2011/0125116 A1 | 5/2011 | Larkin | |
| 2013/0332323 A1 | 12/2013 | Phillips et al. | |
| 2015/0326795 A1 | 11/2015 | Bashkin et al. | |
| 2016/0223382 A1 | 8/2016 | Luber | |
| 2017/0161676 A1 | 6/2017 | Aji | |

OTHER PUBLICATIONS

Anonymous Flexible battery—Wikipedia, Jun. 4, 2015, Retrieved from the Internet: URL: https://enwikipedia.org/w/index.php?title=Flexible_battery&oldid=66544 7102.

* cited by examiner

DETECTING MACHINE ACTION USING A MACHINE ACTION DETECTION SYSTEM

CROSS-REFERENCE TO RELATED APPLICATION

This application is a continuation-in-part of U.S. application Ser. No. 15/615,371, filed on Jun. 6, 2017, which is a continuation-in-part of U.S. application Ser. No. 15/370,933, filed on Dec. 6, 2016, which claims priority to U.S. provisional application Ser. No. 62/263,688, filed on Dec. 6, 2015, each of which is hereby incorporated by reference in its entirety.

BACKGROUND

In the last few decades, vacuum cleaners have become one of the most important item in every household. Vacuum cleaners have seen substantial changes in terms of ease of use and features during this period.

While there has been rapid improvements in the functioning of the vacuum cleaners, there is no available technological solution for a machine manufacturer to determine the usage of the vacuum cleaner by a customer.

SUMMARY

The machine action detection system may be characterized by a pocketsize, portable, automated inventory management device that may be reusable and mountable to a machine of any make to detect a machine action according to an embodiment. The detected actions may include whether the machine motor is on, whether the handle is being moved in a front or a back direction, whether the machine hose is being or not being used.

In one embodiment, the inventor management system also identifies false positives when detecting machine action. For example, the machine action detection system does not switch on when the machine is in transit, the machine action detection system does not pick up data on lifting the machine, when the machine handle is turned on without turning on the motor of the machine, rolling back the machine. In one embodiment, one or more of the above edge cases or any other edge case leading to false positives have been avoided through pattern recognition in the vibrations generated by the motor.

The machine action detection system may be programmed to remotely monitor the action of the machine. The machine action detection system may be programmed to conserve power by intermittently powering the machine action detection system.

The machine action detection system may be attached to any machine. In one embodiment, the machine is retrofit connected to the machine. In one embodiment, the machine action detection system is positioned such that when the machine is turned on or the motor of the machine is started then the machine action detection system is activated. The machine action detection system may comprise a small, thin, reusable electronic sticker. For example, the machine action detection system may be provided with a sticker that can be used to stick the system to the machine. The inventory management device may comprise an active battery that does not require recharging.

A machine action detection system to monitor actions of a machine may generally comprise vibration sensor or accelerometer in electronic communication with the battery to generate a vibration signal that corresponds to a vibration of the machine; a storage unit in electronic communication with the vibration sensor to store the measured vibration value; a controller in electronic communication with the vibration sensor and the storage unit to measure a change in the vibration value; a transmitter in electronic communication with the controller to transmit an output signal when the controller measures the change in vibration value and maps the vibration value to different actions; and the battery to power the vibration sensor.

DESCRIPTION OF THE DRAWINGS

The various embodiments described herein may be better understood by considering the following description in conjunction with the accompanying drawings.

DESCRIPTION

As generally used herein, the articles "one", "a", "an" and "the" refer to "at least one" or "one or more", unless otherwise indicated.

As generally used herein, the terms "including" and "having" mean "comprising".

In the following description, certain details are set forth in order to provide a better understanding of various aspects of machine action detection system and methods of making and using the same. However, one skilled in the art will understand that these aspects may be practiced without these details and/or in the absence of any details not described herein. In other instances, well-known structures, methods, and/or techniques associated with methods of practicing the various aspects may not be shown or described in detail to avoid unnecessarily obscuring descriptions of other details of the various aspects.

According to various aspects, more efficient and/or cost-effective machine action detection system and methods of making and using the same are described.

The machine action detection system may be used by end users, retailers, distributors, and manufacturers of consumer goods to collect, track, and/or process machine usage data.

Figure 1:
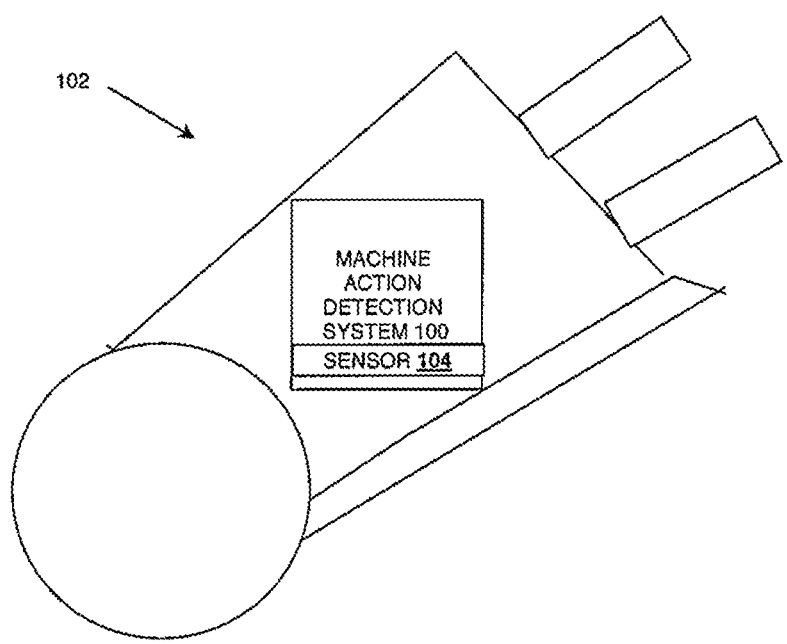
FIG. 1 illustrates an embodiment of a machine action detection system and a vacuum cleaner according to the present invention.

FIG. 1 illustrates a front view of a machine action detection system 100, according to an embodiment. The machine action detection system 100 may be used to monitor the activity of the vacuum cleaner 102, although other types of machines may be monitored.

The machine action detection system 100 may be mounted on a handle of the vacuum cleaner, although the machine action detection system 100 may in this example be positioned on any outer surface of the vacuum cleaner 102 or other machine being monitored. In another example, the machine action detection system 100 is positioned close to a motor of the vacuum cleaner 102. The machine action detection system 100 includes a vibration sensor 104 that may be positioned at the bottom of the machine action detection system 100.

The vacuum cleaner 102 may have different types of hose fittings attached to the vacuum cleaner 102 for performing different type of vacuum cleaning operations. After the vacuum cleaner 102 leaves the manufacturer and/or distributor and travels through the supply chain to the end user, which could be a business entity or a consumer, the machine action detection system may collect and transmit machine usage data to be displayed via a computer interface, such as a mobile application, web application, and computer.

Once the end user connects the machine action detection system to the network, the machine action detection system may be completely automated to track the usage of vacuum cleaner 102 or other machine, including when, where, how often, and for what purpose the vacuum cleaner 102 or other machine is used, consumer demographics, etc. For example, the system may transmit a notification to the end user, retailer, distributor, and manufacturer of the product about the usage of the vacuum cleaner 102 or other machines.

The machine action detection system 100 may connect to a network interface, such as a network interface controlled by the manufacturer and/or distributor, without intervention by the end user. The machine action detection system 100 may connect to the network via LoRa or NB-IoT, for example. The machine action detection system 100 may autonomously track the machine action, for example, usage data, including when, where, and how often the product is used, consumer demographics based on collecting GPS data, etc. The machine action detection system 100 may autonomously transmit a notification to the end user, retailer, distributor, and manufacturer of the product about the usage of the vacuum cleaner 102 or other machine. The machine action detection system 100 may autonomously track and/or transmit without a "command" signal being received by the machine action detection system or initiated by the end user. For example the machine action detection system 100 may send a command whenever a change with respect to the action of the machine action detection system 100 is determined by the autonomous tracking and/or transmission may improve the efficiency and/or reduce the possibility of human error by minimizing the dependency on the end user to have a network hub and associated hardware necessary to communicate and interact with the machine action detection system 100. The machine action detection system 100 may comprise a software development kit (SDK) to capture and report real-time data via, and may allow the compiling of data reports for each manufacturer and/or distributor in discrete time periods, on demand, randomly or continually for more than one machine action detection system to provide the manufacturer and/or distributor data at an aggregate level. The SDK may be configured to allow other home automation devices to connect to as well.

The machine action detection system 102 may be used for new machine testing, for example, a new vacuum cleaner. The machine action detection system described herein may facilitate automated testing and/or collection of machine usage data with minimal or no human intervention, and/or randomized sampling. The machine action detection system described herein may facilitate testing multiple product concepts to determine the most profitable and/or desirable product to go into production. The testing results obtained using the machine action detection system described herein may be less biased and/or unbiased relative to conventional methods to provide a faster time to market and better success rate in new machine launches.

The machine action detection system described herein may collect, process, and/or transmit machine usage data that may be used by manufacturers and distributors of consumer goods to determine wear and tear and maintenance schedule of the machine.

A machine action detection system may be characterized by a surmountable small pocket-size device having one or more sensors that is flexible and attachable to a vacuum cleaner 102 or other machine. The vacuum cleaner 102 or other machine may comprise a power saving circuit to allow continued usage of the device without the need to recharge the battery.

Figure 2:
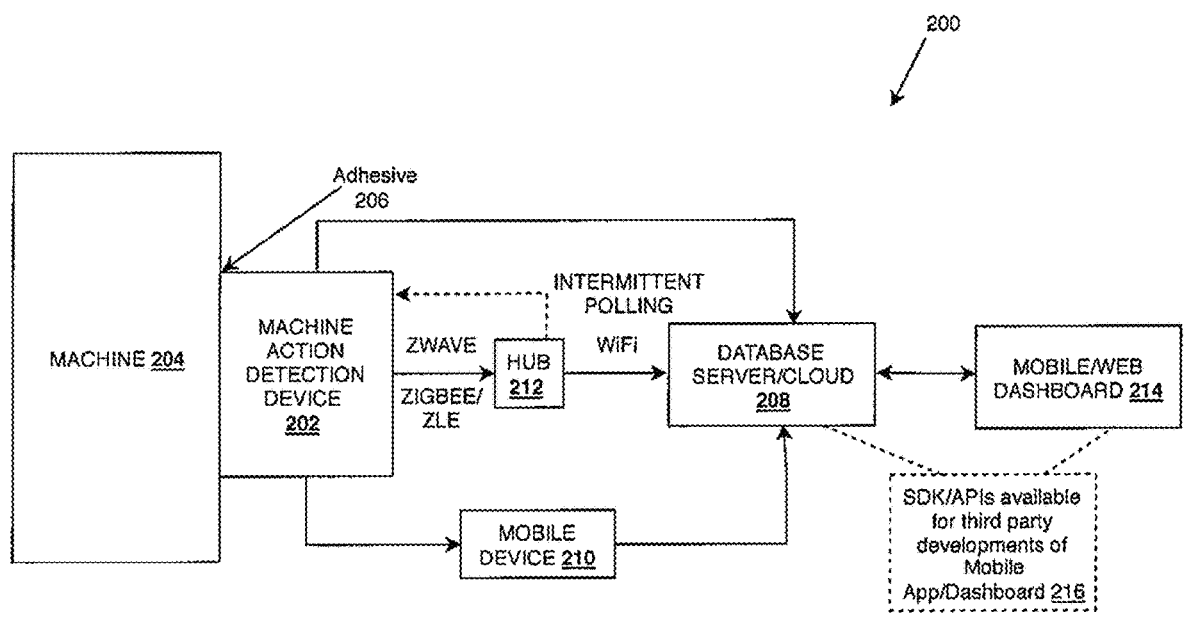
FIG. 2 illustrates an embodiment of a machine action detection system according to the present invention.

FIG. 2 illustrates a block diagram illustrating a machine action detection system 200, according to an embodiment. The machine action detection device 202 is attached to a device (vacuum cleaner) 204. The vacuum cleaner 204 may comprise an adhesive at a trigger point where the machine action detection device may be retrofit connected to the vacuum cleaner 202. The trigger point 206 is a point such that the machine action detection system 202 is actuated by the user turning on the vacuum cleaner 102 or other machine where the lever used to turn on the motor is connected to the machine action detection system's trigger mechanism. The machine action detection system's trigger mechanism may include a button or a handle or any other mechanism that may be used to trigger the vacuum cleaner 102 or other machine.

The machine action detection device may be characterized by one or more of the following, as described in more detail below: (1) a vibration sensor to detect vibration of device, (2) an interrupt counter to measure count of vibration sensor within pre-determined period, (3) a storage unit storing count of the vibration, (4) a controller to determine mapping between measured count and device activities; (4) a transmitter to autonomously transmit an output signal when controller determines the mapped one of the plurality of device activities; (5) a battery that may be active through transit and configured to maintain power using intelligent power saving modes; and (6) automatic data collection, processing, and communication, e.g., when the end user activates the device, it may automatically connect to a hub and automatically begin collecting vacuum cleaner 102 or other machine usage data, and/or the hub may advertise at any period of time desired by the user, e.g., 1 hour.

The machine action detection device 202 may comprise at least one sensor, for example a vibration sensor, to measure the activity of the vacuum cleaner 102 or other machine. The vibration sensor analyses linear velocity, displacement and proximity, or acceleration of the vacuum cleaner 102 or other machine. The vibration data is used to determine the activity being executed by the vacuum cleaner 102 or other machine. The determined activity is sent to the manufacturers and/or distributors, to notify the manufacturers and/or distributors the status of the vacuum cleaner 102 or other machine. The machine action detection system may be configured to notify the manufacturers and/or distributors and/or the end user when the vacuum cleaner 102 or other machine may break down due to an activity for a certain period of time.

The machine action detection device 202 may comprise a transmitter to transmit the measured value to a server 208 in a remote location. The vibration sensor may transmit the measured sensor value to the server 208 by WIFI. The transmitter may comprise a BLUETOOTH or a BLE (Bluetooth low energy) transmitter to communicate to a mobile device 210. The mobile device 210 may act as a modem to communicate with the server 208. The transmitter may comprise a low-power wireless local area network to communicate through a hub 212 with the server 208. The low power communication protocol may comprise ZIGBEE/ZWAVE. The server 208 may comprise software to provide two way communication with a dashboard 214.

The dashboard 214 may comprise a web or mobile application. Additionally, the software may comprise a software development kit 216 including an application program interface (API) to develop any third party software tools. For example, the device may integrate into data analytics/post-purchase consumer electronics platforms seamlessly through the API to build an ecosystem. The machine action detection system also includes an interrupt counter to count the number of times an instantaneous amplitude of vibrations is measured by the vibration sensor. The machine action detection system also includes a timer that measures a time duration between two consecutive amplitude of vibrations detected by the vibration sensor.

Figure 3:
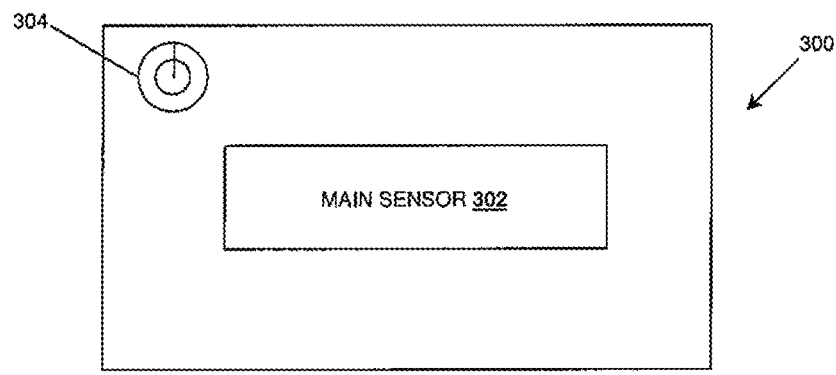
FIG. 3 illustrates an embodiment of a machine action detection system according to the present invention.

FIG. 3 illustrates a high level block diagram illustrating a machine action detection system 300, according to an example. the machine action detection system 300 may comprise a power saving circuit to minimize power consumed such that the user may not need to recharge the battery during use. The power saving circuit, and thereby power consumption, may be related to the vibration of the sensor.

The machine action detection system 300 may be characterized by the following dimensions: up to 200 mm high, such as 1-200 mm, and 50-127 mm, up to 200 mm wide, such as 1-200 mm, and 50-127 mm, and up to 50 mm thick, such as 0.1-50 mm. The machine action detection system 300 may comprise other shapes and dimensions as desired.

When the user attaches the machine action detection device 202 to the vacuum cleaner 102 and turns on the machine action detection system 200 then the machine action detection system 202 is activated via the power button 304 or other power switch engagement device or system. When the machine action detection system 202 detects consecutive amplitude of vibration within a fixed time then the machine action detection device 202 is awakened and then the machine action detection system measures the vibration value and based on the measured value maps the vibration to different activities at a dashboard 214, which may run on a mobile device or a computer, and configures the machine action detection system to a wireless communication protocol, the dashboard 214 may notify the user about the different activities being executed by the machine.

The machine action detection system 200 may be modular and configured to integrate with any other third party inventory management hardware and software (e.g., software development kit, "SDK") 216.

Figure 4A:
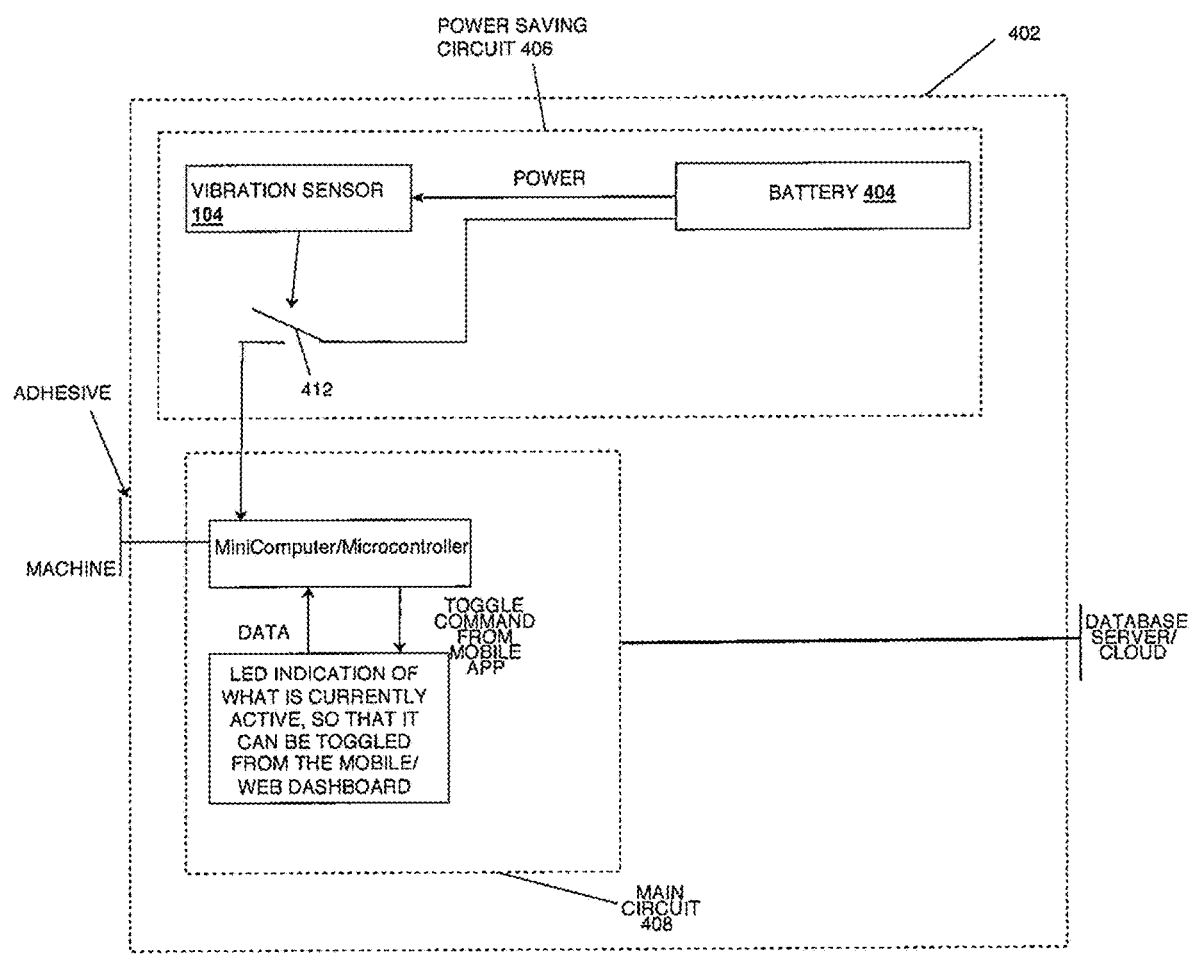
FIGS. 4A and 4B illustrates various embodiments of machine action detection systems according to the present invention.
Figure 4B:
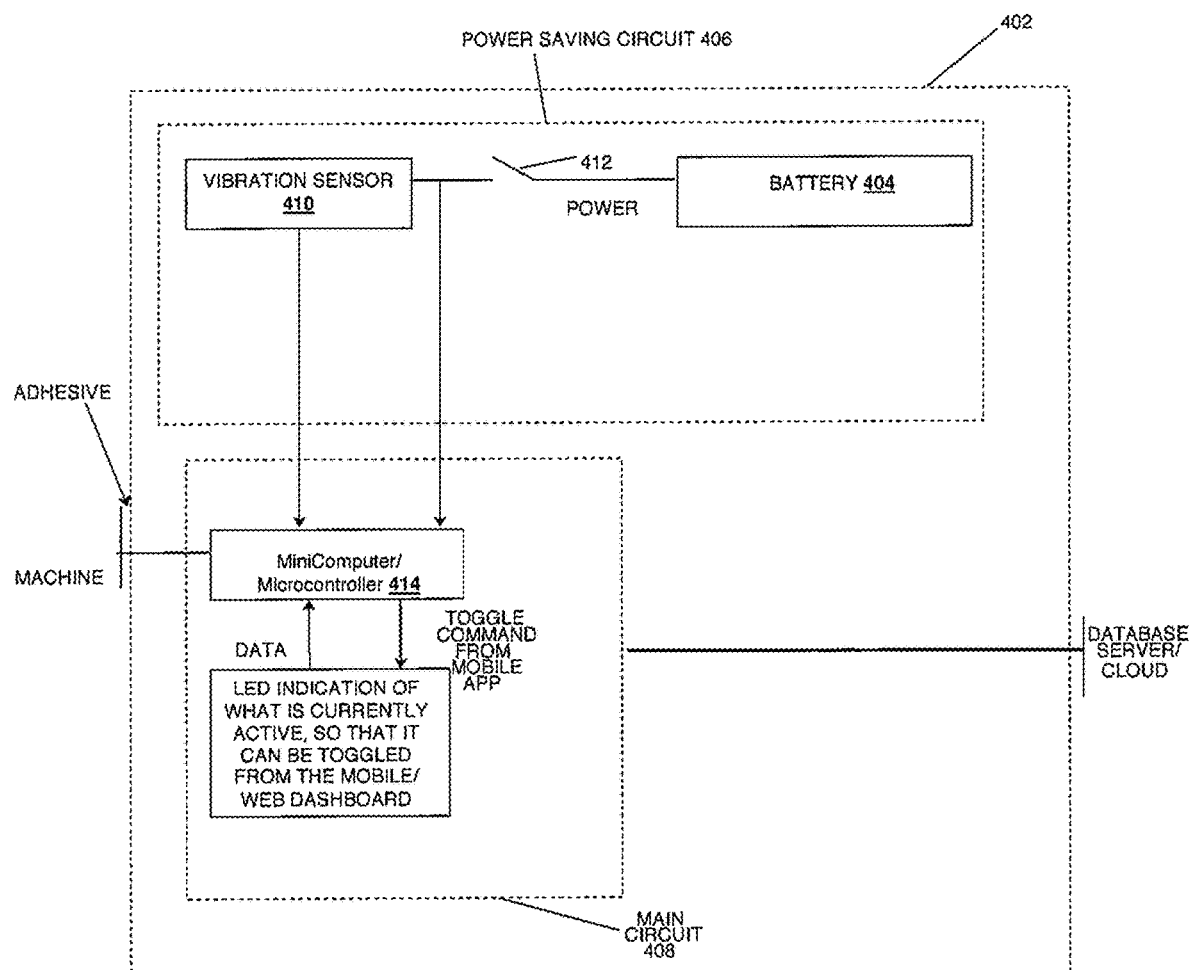

FIGS. 4A-4B illustrates a block diagram of a machine action detection system 400, according to an example. The machine action detection device 202 may comprise a flexible printed circuit board (PCB) or printed electronics 402. The power module may comprise a battery 404 to power the main circuit 408 and a power saving circuit 406.

The power saving circuit 406 may comprise a vibration sensor 104, for example a tilt sensor or a motion sensor, directly connected to the battery 404. The tilt sensor or the motion sensor may detect the duration of time when handle of the machine is in a tilted or straight position when the machine is in use.

The vibration sensor 104 may be constantly powered on when the switch 412 is closed. The vibration sensor 104 may control the main circuit 408 by transmitting a wakeup signal interrupt to the controller when the sensor detects instantaneous amplitude of vibrations to occur twice within a fixed time interval. The controller may be programmed to control the sensitivity of vibration sensor 104 by regulating the voltage.

FIG. 4B illustrates a block diagram of a machine action detection system 400, according to an example. The machine action detection system 400 may comprise a flexible printed circuit board (PCB) or printed electronics 402. The power module may comprise a battery 404 to power the main circuit 408 and a power saving circuit 406. The power saving circuit 406 may comprise a vibration sensor 104, such as a tilt sensor, connected to the battery 404 via a switch 412. When the user powers on the machine 204, the switch 412 closes to connect the battery 404 to the power saving circuit and the main circuit. When the vibration sensor 104 detects a vibration, the controller may be programmed to transmit a signal, e.g., sleep wakeup signal, to the main circuit 408 to turn on the main circuit 408. The controller may be programmed to control the sensitivity of vibration sensor 104 by regulating the voltage. In one example, the vibration sensor 104 may comprise one of an accelerometer, a tilt sensor, a proximity sensor, a position sensor, and a transducer.

When the machine, for example a vacuum cleaner, is used by the end user, the turning on of the machine, for example turning on the motor of the machine, may be detected when the vibration sensor detects instantaneous amplitude of the vibrations to occur twice within a fixed time interval. An instantaneous amplitude is an amplitude that is a sudden increment in amplitude measured by the vibration sensor. The activated machine action detection system then determines whether the vibration is closer to the +/−1 g on the axis that is in the direction of the Gravitational Force. When the vibration is +/−1 g then the machine is determined to be working with handle in a non-tilted position. When the vibration is away from +/−1 g the machine is determined to be working with handle in the tilted position.

The battery may comprise one of a flexible battery and a printed battery. The battery may or may not be rechargeable. The battery may comprise one of a kinetic energy powered battery, a fuel cell, a thermal power source, a lithium-ion battery, a solar panel connected to a battery, a zinc air battery, a button cell battery, a Tesla coil, a printed battery, a flexible battery, a battery made of organic matter, and an alkaline battery. The battery may be characterized by a low capacity.

The machine action detection device may be manufactured using a printed circuit board method including a rigid substrate or flexible substrate, a printed electronic method, a thin-film deposition method, machining, sintering, or any other known or desired method known to a person of ordinary skill in the art.

The controller may be programmed to turn on the main circuit 408. For example, the controller may be programmed to turn on a timer when the instantaneous amplitude of vibrations is detected for two times. The timer may measure a time period when the measured sensor value is near +/−1 g as a machine working when the handle of machine is in a non-tilted position and when the measured sensor value is away from +/−1 g as a machine working when the handle of machine is in a tilted position. When the timer expires, the controller may be programmed to turn on the main circuit 408.

The main circuit 408 may comprise the minicomputer 414 including a wireless module and modem. The minicomputer 414 may be programmed to control the vibration sensor 104. As described above, the main circuit may be powered on intermittently as determined by the power saving circuit 406.

The vibration sensor 104 may detect the vibration of the machine in use. The vibration sensor 104 may transmit a low voltage signal to the minicomputer 414 when instantaneous amplitude of vibrations is detected for two times.

The minicomputer 414 may receive and process the input value. The minicomputer may be programmed to reduce the power consumption. The minicomputer may store one or more input values. Referring to FIG. 2, the minicomputer may be programmed to send the input value via the WIFI module to the server 208 when the input value transmitted by the vibration sensor includes two instantaneous amplitude of vibrations. The input value may be transmitted to the server using the communication channels as set by the user in the initial setup. The input values may be collected for a desired period of time, and stored in a database, such as server 208, and/or the storage unit. The database may be used to aggregate and correlate inventory information that may be useful in other business applications or business decisions.

The vibration sensor 104 may use less power to operate compared to conventional inventory management devices because the battery is not always on but turned on intermittently via circuit. The machine action detection system may communicate with the server only when instantaneous amplitude of vibrations is detected for two times thereby limiting the usage of and power consumed by the BLUETOOTH, BLE, ZIGBEE/ZWAVE, WIFI, LoRa, and/or NB-IoT module(s).

The transmitter may comprise at least one of BLUETOOTH communication, a radio-frequency identification (RFID) communication, a near-field communication (NFC), or a personal area network (PAN) communication to connect to a WIFI or Ethernet communications network or machine-to-machine (M2M) wireless communications network; ZIGBEE/ZWAVE communication; LoRa communication; and NB-IoT communications.

Figure 5:
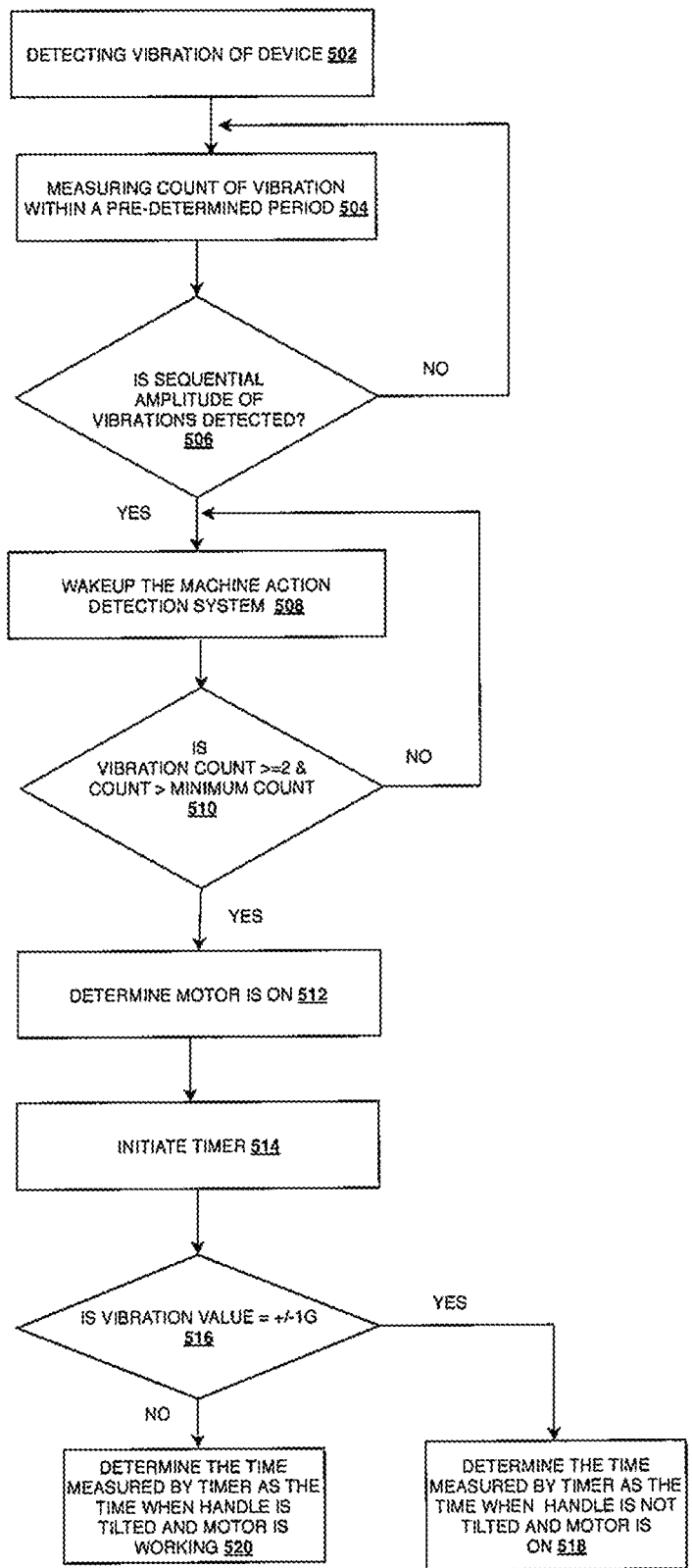
FIG. 5 is a flow chart of an embodiment of a method for obtaining machine action data according to the present invention.

FIG. 5 illustrates a flow chart illustrating the machine action detection system, according to an example. At 502, vibration sensor at the machine detection system detects instantaneous vibration of device. At 504, a check is performed to measure count of the vibrations within a predetermined time. Next at 506 a check is performed to determine whether sequential amplitude of vibrations are detected within a fixed period of time. In case sequential amplitude of vibrations are detected within the fixed period of time (condition in 506 is true) then the machine action detection system is awakened (508). Next the activated machine action detection system determines whether the sequential amplitude of vibrations are detected for at least a minimum number of count (510). In case the condition in 510 is true then the motor of machine is determined as on (512) and a timer is initiated to count the vibration time (514). Next a determination is made whether the vibration count is close to +/−1 g (516). In case the vibration count is close to +/−1 g (condition in 516 is true) then the time measured by the timer is determined as the time when the handle of the machine is not tilted and the motor is on. In case the vibration count is not close to +/−1 g (condition in 516 is false) then the time measured by the timer is determined as the time when the handle of the machine is tilted and the motor is on.

The machine action detection system may be characterized by one or more of the following: small size, flexibility, reusability and nonintrusive monitoring of the activities of the machine. The small size and flexible machine action detection system as described herein may comprise an electronic sticker on a flexible printed circuit board (PCB) or printed electronics. The reusable machine action detection system as described herein may comprise the electronic sticker removeably attached to a container. The machine action detection system may comprise an in-house power saving circuit such that the inventory management device lacks the need for frequent recharging.

Figure 6:
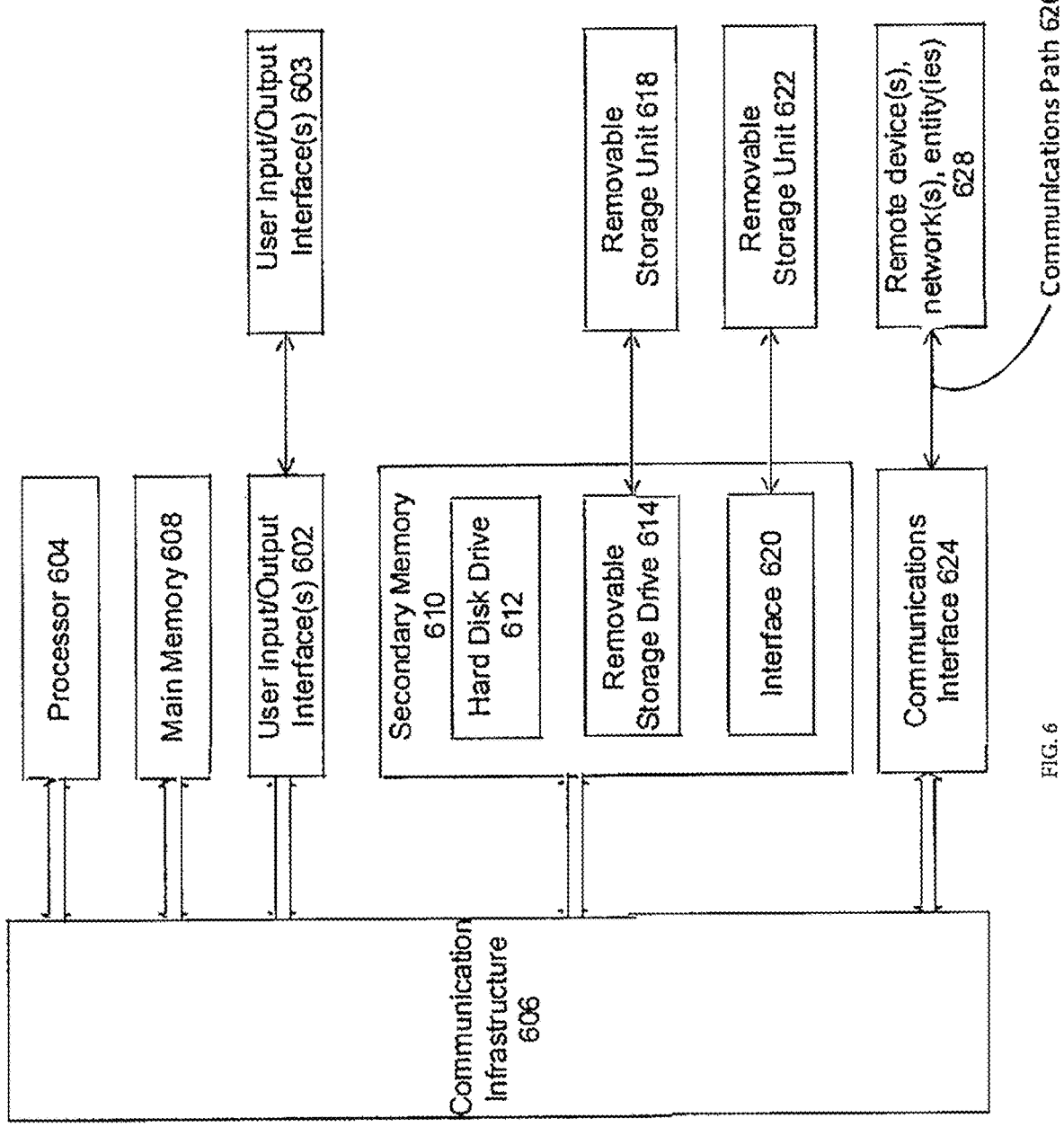
FIG. 6 illustrates an embodiment of a computer system useful for implementing various embodiments of the machine action detection system according to the present invention.

Various examples can be implemented, for example, using one or more computer systems, such as computer system 600 shown in FIG. 6. Computer system 600 can be used, for example, to implement the method illustrated in FIG. 5. Computer system 600 can be any computer capable of performing the functions described herein.

Computer system 600 can be any well-known computer capable of performing the functions described herein. Computer system 500 includes one or more processors (also called central processing units, or CPUs), such as a processor 604. Processor 604 is connected to a communication infrastructure or bus 606.

One or more processors 604 may each be a graphics processing unit (GPU). In an example, a GPU is a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 600 also includes user input/output device(s) 603, such as monitors, keyboards, pointing devices, etc., that communicate with communication infrastructure 506 through user input/output interface(s) 602.

Computer system 600 also includes a main or primary memory 608, such as random access memory (RAM). Main memory 608 may include one or more levels of cache. Main memory 608 has stored therein control logic (i.e., computer software) and/or data.

Computer system 600 may also include one or more secondary storage devices or memory 610. Secondary memory 610 may include, for example, a hard disk drive 612 and/or a removable storage device or drive 614. Removable storage drive 614 may be a floppy disk drive, a magnetic tape drive, a compact disk drive, an optical storage device, tape backup device, and/or any other storage device/drive.

Removable storage drive 614 may interact with a removable storage unit 618. Removable storage unit 618 includes a computer usable or readable storage device having stored thereon computer software (control logic) and/or data. Removable storage unit 618 may be a floppy disk, magnetic tape, compact disk, DVD, optical storage disk, and/any other computer data storage device. Removable storage drive 614 reads from and/or writes to removable storage unit 618 in a well-known manner.

According to an exemplary example, secondary memory 610 may include other means, instrumentalities or other approaches for allowing computer programs and/or other instructions and/or data to be accessed by computer system 600. Such means, instrumentalities or other approaches may include, for example, a removable storage unit 622 and an interface 620. Examples of the removable storage unit 622 and the interface 620 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 600 may further include a communication or network interface 624. Communication interface 624 enables computer system 600 to communicate and interact with any combination of remote devices, remote networks, remote entities, etc. (individually and collectively referenced by reference number 628). For example, communication interface 624 may allow computer system 600 to communicate with remote devices 628 over communications path 626, which may be wired and/or wireless, and which may include any combination of LANs, WANs, the Internet, etc. Control logic and/or data may be transmitted to and from computer system 600 via communication path 626.

In an example, a tangible apparatus or article of manufacture comprising a tangible computer useable or readable medium having control logic (software) stored thereon is also referred to herein as a computer program product or program storage device. This includes, but is not limited to, computer system 600, main memory 608, secondary memory 610, and removable storage units 618 and 622, as well as tangible articles of manufacture embodying any combination of the foregoing. Such control logic, when executed by one or more data processing devices (such as computer system 600), causes such data processing devices to operate as described herein.

Based on the teachings contained in this disclosure, it will be apparent to persons skilled in the relevant art(s) how to make and use examples of this disclosure using data processing devices, computer systems and/or computer architectures other than that shown in FIG. 6. In particular, examples may operate with software, hardware, and/or operating system implementations other than those described herein.

The following aspects are disclosed in the present invention:

Aspect 1. A machine action detection system to detect a plurality of device activities of a device, the machine action detection system comprising: an inventory management device comprising a vibration sensor in electronic communication with the device to detect vibration of the device; an interrupt counter in communication with the vibration sensor to measure a count of vibration detected by the vibration sensor within a pre-determined period; a storage unit in electronic communication with the interrupt counter to store the count of vibration; a controller in electronic communication with the vibration sensor and the storage unit to determine a mapping between the measured count and one of the plurality of device activities; a transmitter in electronic communication with the controller to autonomously transmit an output signal when the controller determines the mapped one of the plurality of device activities; and a flexible battery to power the vibration sensor, storage unit, controller, and transmitter, wherein the inventory management device has a thickness less than 1 mm.

Aspect 2. The system of any one of the preceding aspects further comprising a timer to measure the duration of two consecutive vibrations.

Aspect 3. The system of any one of the preceding aspects, wherein the controller determines whether the count of the vibration is equal to or unequal to 1 g.

Aspect 4. The system of any one of the preceding aspects, wherein when the count of the vibration is equal to a predetermined value, then the one of the plurality of device activities determined by the device is that the device is in a non-tilted position and a motor of the device is on.

Aspect 5. The system of any one of the preceding aspects, wherein when the count of the vibration is unequal to a predetermined value, then the one of the plurality of device activities determined by the device is that the device is in a tilted position and a motor of the device is on.

Aspect 6. The system of any one of the preceding aspects, wherein the inventory management device is activated when the count measured by the interrupt counter is greater than a minimum count.

Aspect 7. The system of any one of the preceding aspects, wherein the transmitter comprises a radio transmitter including one of a LoRa transmitter and a NB-IoT transmitter.

Aspect 8. The system of any one of the preceding aspects, wherein the controller is programmed to collect sensor information.

Aspect 9. The system of any one of the preceding aspects, wherein the measured sensor value determines position of a handle of the device.

Aspect 10. The system of any one of the preceding aspects, wherein the transmitter comprises a radio transmitter including one of a LoRa transmitter and a NB-IoT transmitter.

Aspect 11. The system of any one of the preceding aspects comprising a vacuum cleaner having a handle, wherein the inventory management device is removeably coupled to the handle of the vacuum cleaner.

Aspect 12. A system to determine activity of a machine, the system comprising: at least a machine comprising an amount of material; the machine action detection system of any one of the preceding aspects removeably coupled to an exterior surface of the machine; a server in electronic communication with the machine action detection system to receive the output signal and automatically communicate the output signal to at least a user, wherein a measured sensor value indicates position of the handle of the machine.

Aspect 13. The system of any one of the preceding aspects, wherein the machine comprises a vacuum cleaner, and the measured sensor value indicates position of the handle of the vacuum cleaner.

Aspect 14. The system of any one of the preceding aspects, wherein the machine action detection system is automated to track the usage of vacuum cleaner, including when, where, how often, and for what purpose the vacuum cleaner is used.

Aspect 15. A method of detecting activity of a machine having the machine action detection system of any one of the preceding aspects removable coupled to an exterior surface of the device, the method comprising: detecting vibration of the device; measuring a count of vibration detected by the vibration sensor within a pre-determined period; storing the count of vibration; determining a mapping between the measured count and one of the plurality of device activities; and autonomously transmitting an output signal when the controller determines the mapped one of the plurality of device activities.

Aspect 16. The method of any one of the preceding aspects, further comprising measuring the duration of two consecutive vibrations.

Aspect 17. The method of any one of the preceding aspects, further comprising determining whether the count of the vibration is equal to or unequal to 1 g.

Aspect 18. The method of any one of the preceding aspects, wherein when the count of the vibration is equal to 1 g then determining the one of the plurality of device activities as the device is in a non-tilted position and a motor of the device is on.

Aspect 19. The method of any one of the preceding aspects, wherein when the count of the vibration is not equal to 1 g then determining the one of the plurality of device activities as the device is in a tilted position and a motor of the device is on.

Aspect 20. The method of any one of the preceding aspects comprising activating the inventory management device when the count measured by the interrupt counter is greater than a minimum count.

It is to be appreciated that the Description section, and not the Summary and Abstract sections, is intended to be used to interpret the claims. The Summary and Abstract sections may set forth one or more but not all exemplary examples of the present invention as contemplated by the inventor(s), and thus, are not intended to limit the present invention and the appended claims in any way.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific examples will so fully reveal the general nature of the invention that others can, by applying knowledge within the skill of the art, readily modify and/or adapt for various applications such specific examples, without undue experimentation, without departing from the general concept of the present invention. Therefore, such adaptations and modifications are intended to be within the meaning and range of equivalents of the disclosed examples, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary examples, but should be defined only in accordance with the following claims and their equivalents.

The illustrations of the examples described herein are intended to provide a general understanding of the various examples. The illustrations are not intended to serve as a complete description of all of the elements and features of apparatus and systems that utilize the structures or methods described herein. Many other examples may be apparent to those skilled in the art upon reviewing the disclosure. Other examples may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive. In addition, in the foregoing Description, various features may be grouped or described together for the purpose of streamlining the disclosure. This disclosure is not to be interpreted as reflecting an intention that all such features are required to provide an operable example.

All documents cited herein are incorporated herein by reference, but only to the extent that the incorporated material does not conflict with existing definitions, statements, or other documents set forth herein. The following documents are incorporated herein by reference: U.S. application Ser. No. 16/179,998, U.S. application Ser. No. 16/100,168, U.S. application Ser. No. 16/056,843 and U.S. application Ser. No. 16/056,929. To the extent that any meaning or definition of a term in this document conflicts with any meaning or definition of the same term in a document incorporated by reference, the meaning or definition assigned to that term in this document shall govern. The citation of any document is not to be construed as an admission that it is prior art with respect to this application.

What is claimed:

1. A machine action detection system to detect a plurality of device activities of a device, the machine action detection system comprising:
    an inventory management device comprising
        a vibration sensor in electronic communication with the device to detect vibration of the device;
        an interrupt counter in communication with the vibration sensor to measure a count of vibration detected by the vibration sensor within a pre-determined period;
        a storage unit in electronic communication with the interrupt counter to store the count of vibration;
        a controller in electronic communication with the vibration sensor and the storage unit to determine a mapping between the measured count and one of the plurality of device activities;
        a transmitter in electronic communication with the controller to autonomously transmit an output signal when the controller determines the mapped one of the plurality of device activities; and
        a flexible battery to power the vibration sensor, storage unit, controller, and transmitter,
    wherein the inventory management device has a thickness less than 1 mm.

2. The system of claim 1 further comprising a timer to measure the duration of two consecutive vibrations.

3. The system of claim 1, wherein the controller determines whether the count of the vibration is equal to or unequal to 1 g.

4. The system of claim 3, wherein when the count of the vibration is equal to a predetermined value, then the one of the plurality of device activities determined by the device is that the device is in a non-tilted position and a motor of the device is on.

5. The system of claim 3, wherein when the count of the vibration is unequal to a predetermined value, then the one of the plurality of device activities determined by the device is that the device is in a tilted position and a motor of the device is on.

6. The system of claim 1, wherein the inventory management device is activated when the count measured by the interrupt counter is greater than a minimum count.

7. The system of claim 1, wherein the transmitter comprises a radio transmitter including one of a LoRa transmitter and a NB-IoT transmitter.

8. The system of claim 1, wherein the controller is programmed to collect sensor information.

9. The system of claim 1, wherein the measured sensor value determines position of a handle of the device.

10. The system of claim 1, wherein the transmitter comprises a radio transmitter including one of a LoRa transmitter and a NB-IoT transmitter.

11. The system of claim 1 comprising a vacuum cleaner having a handle, wherein the inventory management device is removeably coupled to the handle of the vacuum cleaner.

12. A system to determine activity of a machine, the system comprising:

at least a machine comprising an amount of material;

the machine action detection system of claim 1 removeably coupled to an exterior surface of the machine;

a server in electronic communication with the machine action detection system to receive the output signal and automatically communicate the output signal to at least a user, wherein a measured sensor value indicates position of the handle of the machine.

13. The system of claim 12, wherein the machine comprises a vacuum cleaner, and the measured sensor value indicates position of the handle of the vacuum cleaner.

14. The system of claim 13, wherein the machine action detection system is automated to track the usage of vacuum cleaner, including when, where, how often, and for what purpose the vacuum cleaner is used.

* * * * *